(No Model.)
R. T. ELWELL.
ARMORED INSULATING CONDUIT.
No. 564,174. Patented July 14, 1896.
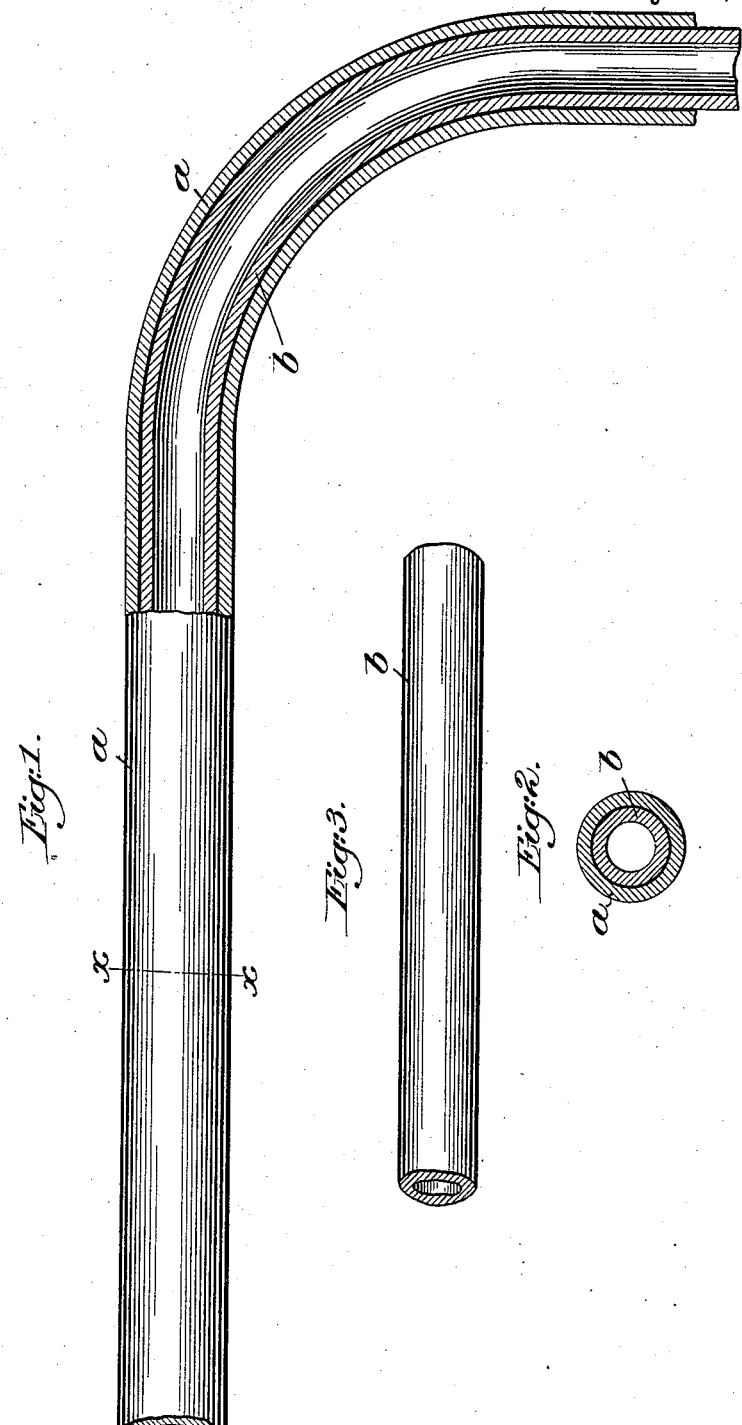
Witnesses.
Fred S. Greenleaf.
Thomas F. Drummond.
Inventor:
Russell T. Elwell.
By Crosby & Gregory.
Attys.
THE NORRIS PETERS CO., PHOTO-LITHO., WASHINGTON, D. C.

UNITED STATES PATENT OFFICE.

RUSSELL T. ELWELL, OF HYDE PARK, MASSACHUSETTS, ASSIGNOR OF ONE-HALF TO AMANDA M. LOUGEE, OF BOSTON, MASSACHUSETTS.

ARMORED INSULATING-CONDUIT.

SPECIFICATION forming part of Letters Patent No. 564,174, dated July 14, 1896.

Application filed January 28, 1896. Serial No. 577,121. (No model.)

*To all whom it may concern:*

Be it known that I, RUSSELL T. ELWELL, of Hyde Park, county of Norfolk, and State of Massachusetts, have invented an Improvement in Armored Insulating-Conduits, of which the following description, in connection with the accompanying drawings, is a specification, like letters on the drawings representing like parts.

Prior to my invention what are known as "armored" insulating-conduits, as usually constructed, consist of an outer metallic armor tube and an inclosed, usually paper, insulating-tube, the latter being usually coated or saturated with tar or pitch to render it as nearly as possible impervious to water.

An objection to conduits of the above construction is that the inner insulating-tube is not sufficiently impervious to water and being stiff and rigid cannot be bent without fracturing or breaking and thereby destroying the insulation.

The object of my present invention is, first, to provide an armored insulating-conduit which can be freely bent or curved without injuring the inner insulating-tube, and, second, an armored conduit wherein the insulating-tube shall itself be more perfectly impervious to water and moisture, and which is further protected from water and moisture by a layer of rubber or other waterproof or water-resisting cement interposed between it and its inclosing armor-tube.

My invention comprehends an outer metallic armor-tube and an inclosed insulating-tube, preferably of rubber or a composition containing rubber, said inner tube being united to the outer or inclosing armor-tube by an interposed layer of rubber or other water-resisting cement.

In the preferred embodiment of my invention the outer armor-tube is capable of being bent or curved as may be necessary to carry the wires in desired directions, and the inner insulating-tube is of the composition of hard rubber, but is only partially vulcanized, thereby leaving it of considerable stiffness to resist collapse, yet capable of being bent or curved sufficiently for use without in any way fracturing or cracking.

In the drawings, Figure 1, in side elevation, partial section, shows a portion of armored insulating-conduit embodying my invention; Fig. 2, a cross-section of the same on the dotted line *x x*, Fig. 1; and Fig. 3, a view showing a piece of the inner insulating-tube detached.

In the drawings, showing one embodiment of my invention, *a* is the outer or armor tube, of suitable material, preferably metal, and *b* is the inner or insulating tube, through which the electric wires, whether themselves insulated or not, are extended.

For the best results, and for convenience in running the wires, the outer or, as I shall hereinafter designate it, the armor tube *a*, should be of a metal, such as iron or brass, which can be bent or curved for rounding of corners, &c., and to enable said armor-tube to be so bent or curved without fracturing or cracking the inner or insulation tube my present invention comprehends the use of a tube *b*, of or containing rubber, which is itself an insulator, is one of the best-known water or moisture resisting mediums, and is capable of being bent or curved, as needed, without injury.

To prevent as far as possible access of water or moisture to this inner or insulating tube, my invention contemplates the interposition between the outside of said tube and its inclosing armor-tube of a layer of rubber or other suitable water or moisture resisting cement or cementitious substance, which serves the added purpose of uniting the inner and outer tubes by an elastic binder, which is not injured by the binding of the conduit and always holds the inner tube in full rounded shape and against collapse.

In the practice of my invention I prefer to make the inner, insulating tube from a compound or mixture substantially like that of the well-known hard rubber, but instead of fully vulcanizing the tube, as when producing hard rubber, I but partially vulcanize it, thus leaving the tube in a condition in which it can be bent or curved, as needed, yet always being of sufficient stiffness and rigidity to hold its shape in long lengths of ten or twenty feet or more, thus enabling it to be freely inserted in the long lengths of armor tube or pipe commonly used without fear of its buckling or doubling when partially inserted, and further enabling it to hold its full rounded shape or form during the binding of the conduit and preventing collapse at any point or points which would interfere with the ready insertion of the electric wires—that is, the insulating-tube of itself is of such stiffness that it will never buckle or bulge within the armor to interfere with the insertion of the wires or during the insertion of the tube in its armor, yet it may be bent or curved without danger of breaking it and destroying the insulation.

The armored conduit embodying my invention presents first an outer, resisting or armored material, next a layer of waterproof or moisture-resisting cementitious substance to prevent water and moisture reaching the inner insulating-tube, and, lastly, an inner tube of insulating material, itself capable of being bent or curved as necessary without breaking or destroying the insulation.

My improved armored conduit is practically incombustible.

My invention is not limited to the particular shape of conduit or to the particular embodiment shown, as the same may be varied within the scope of my invention, as set forth in the claims.

Having described my invention, what I claim, and desire to secure by Letters Patent, is—

1. An armored insulating-conduit consisting of a metallic armor-tube, an inclosed insulating-tube capable of being bent or curved without fracture, and an interposed layer of water-resisting cementitious substance, uniting the two tubes one to the other, substantially as described.

2. An armored insulating-conduit consisting of a metallic armor-tube; an inclosed insulating-tube both capable of being bent or curved without fracture; and an interposed layer of water-resisting and elastic cementitious substance, uniting the two tubes one to the other and permitting simultaneous binding of both, substantially as described.

3. An armored insulating-conduit consisting of a metallic armor-tube, and an inclosed insulating-tube of the composition of hard rubber but only partially vulcanized to leave it in a condition capable of bending without fracture, yet of sufficient stiffness and rigidity to hold its full rounded form under all conditions, substantially as described.

4. An armored insulating-conduit consisting of a metallic armor-tube, an inclosed insulating-tube of the composition of hard rubber but only partially vulcanized to leave it in a condition capable of bending without fracture, yet of sufficient stiffness and rigidity to hold its full rounded form under all conditions, and a layer of elastic water-resisting cement joining the two tubes one to the other, substantially as described.

5. An armored insulating-conduit consisting of a metallic armor-tube, and an inclosed insulating-tube of pliable rubber having sufficient hardness to retain its tubular form and resist fracture when bent or curved, substantially as described.

In testimony whereof I have signed my name to this specification in the presence of two subscribing witnesses.

RUSSELL T. ELWELL.

Witnesses:
GEO. W. GREGORY,
AUGUSTA E. DEAN.